United States Patent
Bouchard (10) Patent No.: US 12,326,641 B2
(45) Date of Patent: Jun. 10, 2025

(54) FRONT PLANE LAMINATES WITH OUTER SURFACE ELECTRICAL CONNECTIONS

(71) Applicant: E INK CORPORATION, Billerica, MA (US)

(72) Inventor: Alain Bouchard, Boston, MA (US)

(73) Assignee: E Ink Corporation, Billerica, MA (US)

( * ) Notice: Subject to any disclaimer, the term of this patent is extended or adjusted under 35 U.S.C. 154(b) by 803 days.

(21) Appl. No.: 17/489,248

(22) Filed: Sep. 29, 2021

(65) Prior Publication Data

US 2022/0107541 A1 Apr. 7, 2022

Related U.S. Application Data

(60) Provisional application No. 63/086,695, filed on Oct. 2, 2020.

(51) Int. Cl.
*G02F 1/1676* (2019.01)
*G02F 1/16755* (2019.01)
(Continued)

(52) U.S. Cl.
CPC ........ *G02F 1/1676* (2019.01); *G02F 1/16755* (2019.01); *G02F 1/167* (2013.01); *G02F 1/16757* (2019.01)

(58) Field of Classification Search
CPC ............. H01L 27/1214; H01L 27/1266; H01L 21/6835; H01L 2221/68363;
(Continued)

(56) References Cited

U.S. PATENT DOCUMENTS 5,760,761 A 6/1998 Sheridon
5,777,782 A 7/1998 Sheridon
(Continued)

FOREIGN PATENT DOCUMENTS

JP 2006119772 A 5/2006
JP 2011099948 A 5/2011
(Continued)

OTHER PUBLICATIONS

Korea Intellectual Property Office, "International Search Report and Written Opinion", PCT/US2021/052658, Jan. 18, 2022.
(Continued)

*Primary Examiner* — Brandi N Thomas
(74) *Attorney, Agent, or Firm* — Brian D. Bean (57) ABSTRACT

A light-transmissive substrate having an inner surface, an outer surface opposite the inner surface, and a plurality of through holes. When coupled with a light-transmissive conductive material; such as indium tin oxide (ITO), the substrate provides electrical connections between a light-transmissive electrically-conductive layer, which may be used as a top electrode in an electro-optic display, and contact spots on the outer surface of the light-transmissive substrate. Accordingly, the light-transmissive substrate allows for simpler electrical connections for electro-optic displays, especially for large format devices that may need to be cut or assembled in the field. Additionally, the redundancy of having tens to hundreds of electrical contacts minimizes the chance that a device will be rendered inoperable due to a broken electrical connection.

20 Claims, 7 Drawing Sheets

(51) Int. Cl.
G02F 1/167 (2019.01)
G02F 1/16757 (2019.01)

(58) Field of Classification Search
CPC . H01L 2221/68354; H01L 2221/68368; H01L
2224/16225; H01L 2221/68359; H01L
29/78603; H01L 2924/12044; H01L
2924/30105; H01L 21/67011; H01L
2221/68322; H01L 2221/68381; H01L
2224/16; H01L 27/1218; H01L 27/13;
H01L 2924/01005; H01L 2924/01006;
H01L 2924/01013; H01L 2924/01015;
H01L 2924/01033; H01L 2924/01079;
H01L 2924/12042; H01L 2224/04026;
H01L 2224/05568; H01L 2224/48091;
H01L 2224/48227; H01L 2224/48465;
H01L 2224/83192; H01L 2224/838;
H01L 24/29; H01L 24/83; H01L 27/12;
H01L 27/1259; H01L 27/1288; H01L
2924/00014; H01L 2924/0002; H01L
2924/01004; H01L 2924/01056; H01L
2924/0781; H01L 2924/12041; H01L
21/6836; H01L 2221/68318; H01L
2221/6835; H01L 2224/0231; H01L
2224/02377; H01L 2224/05001; H01L
2224/05124; H01L 2224/05139; H01L
2224/05144; H01L 2224/05166; H01L
2224/05171; H01L 2224/05184; H01L
2224/05639; H01L 2224/05644; H01L
2224/05655; H01L 2224/05664; H01L
2224/05671; H01L 2224/05684; H01L
2224/0615; H01L 2224/13008; H01L
2224/13099; H01L 2224/1319; H01L
2224/13644; H01L 2224/13666; H01L
2224/32145; H01L 2224/73204; H01L
2224/83001; H01L 2224/95; H01L
2225/06562; H01L 23/5228; H01L 24/02;
H01L 24/11; H01L 24/13; H01L 27/118;
H01L 27/124; H01L 27/1248; H01L
29/66757; H01L 29/66772; H01L
2924/0001; H01L 2924/01011; H01L
2924/01022; H01L 2924/01024; H01L
2924/01029; H01L 2924/01046; H01L
2924/01047; H01L 2924/01049; H01L
2924/01066; H01L 2924/01073; H01L
2924/01074; H01L 2924/01075; H01L
2924/01078; H01L 2924/01082; H01L
2924/01088; H01L 2924/014; H01L
2924/09701; H01L 2924/14; H01L
2924/15787; H01L 2924/19043; H01L
2924/3011; H01L 2933/0016; H01L
33/24; H01L 33/38; H01L 33/62
IPC ............ G02F 1/167, 2202/28, 1/1333, 1/13305,
1/13613, 1/1676, 1/1681, 1/13,
1/133354, 1/13454, 1/1675, 2201/42,
2202/16, 1/133377, 1/1334, 1/1533,
1/155, 1/16755, 1/03, 1/1309,
1/133385, 1/134363, 1/13439,
1/1345, 1/13452, 1/16757, 1/1679,
1/1685, 2203/69, 1/133308,
1/133351, 1/1347, 1/13475, 1/136,
1/153, 1/161, 2001/1678, 2201/12,
2201/44
See application file for complete search history.

(56) References Cited

U.S. PATENT DOCUMENTS

| | | |
|---|---|---|
| 5,808,783 A | 9/1998 | Crowley |
| 6,054,071 A | 4/2000 | Mikkelsen, Jr. |
| 6,055,091 A | 4/2000 | Sheridon et al. |
| 6,097,531 A | 8/2000 | Sheridon |
| 6,128,124 A | 10/2000 | Silverman |
| 6,137,467 A | 10/2000 | Sheridon et al. |
| 6,147,791 A | 11/2000 | Sheridon |
| 6,241,921 B1 | 6/2001 | Jacobson et al. |
| 6,301,038 B1 | 10/2001 | Fitzmaurice et al. |
| 6,312,304 B1 | 11/2001 | Duthaler et al. |
| 6,866,760 B2 | 3/2005 | Paolini, Jr. et al. |
| 6,870,657 B1 | 3/2005 | Fitzmaurice et al. |
| 6,922,276 B2 | 7/2005 | Zhang et al. |
| 6,950,220 B2 | 9/2005 | Abramson et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,144,942 B2 | 12/2006 | Zang et al. |
| 7,286,281 B2 | 10/2007 | Lee et al. |
| 7,312,784 B2 | 12/2007 | Baucom et al. |
| 7,339,715 B2 | 3/2008 | Webber et al. |
| 7,342,068 B2 | 3/2008 | Klingenberg et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,535,624 B2 | 5/2009 | Amundson et al. |
| 7,679,814 B2 | 3/2010 | Paolini, Jr. et al. |
| 7,715,088 B2 | 5/2010 | Liang et al. |
| 7,839,564 B2 | 11/2010 | Whitesides et al. |
| 8,009,348 B2 | 8/2011 | Zehner et al. |
| 8,797,259 B2 | 8/2014 | Yoshida |
| 8,907,561 B2 | 12/2014 | Ryu et al. |
| 9,279,906 B2 | 3/2016 | Kang |
| 9,470,948 B2 | 10/2016 | Abe et al. |
| 10,276,109 B2 | 4/2019 | Crounse et al. |
| 10,317,767 B2 | 6/2019 | Paolini, Jr. et al. |
| 10,444,553 B2 | 10/2019 | Laxton |
| 10,503,041 B2 | 12/2019 | Harris et al. |
| 11,086,186 B2 | 8/2021 | Lattes et al. |
| 2013/0271819 A1* | 10/2013 | Abe .................. G02F 1/167 29/527.1 |
| 2015/0005720 A1 | 1/2015 | Zang |
| 2016/0012710 A1 | 1/2016 | Lu et al. |
| 2017/0097555 A1 | 4/2017 | Lattes et al. |
| 2019/0122617 A1 | 4/2019 | Sim et al. |

FOREIGN PATENT DOCUMENTS

| | | | |
|---|---|---|---|
| JP | 2013235095 | * 11/2013 | ............ G02F 1/187 |
| JP | 2013235095 A | 11/2013 | |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

Wood, D., "An Electrochromic Renaissance?" Information Display, 18(3), Mar. 24, 2002.

Bach, Udo. et al., "Nanomaterials-Based Electrochromics for Paper-Quality Displays", Adv. Mater, vol. 14, No. 11, pp. 845-848, (Jun. 5, 2002).

Hayes, R.A. et al., "Video-Speed Electronic Paper Based on Electrowetting", Nature, vol. 425, No. 25, pp. 383-385 (Sep. 2003).

* cited by examiner

FRONT PLANE LAMINATES WITH OUTER SURFACE ELECTRICAL CONNECTIONS

RELATED APPLICATIONS

This application claims priority to U.S. Provisional Patent Application No. 63/086,695, filed Oct. 2, 2020. All patents and publications disclosed herein are incorporated by reference in their entireties.

FIELD OF THE INVENTION

This invention relates to front plane laminates, processes for the production of the laminates and electro-optic displays formed from the laminates. More specifically, in one aspect this invention relates to a front plane laminate having a substrate which includes an interspersed portion distributed within a continuous portion. The interspersed portion includes an electrically-conductive material forming electrical connections between an electrically-conductive layer of the front plane laminate and contact spots on the outer surface of the substrate.

BACKGROUND

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence, or, in the case of displays intended for machine reading, pseudo-color in the sense of a change in reflectance of electromagnetic wavelengths outside the visible range.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R.A., et al., "Video-Speed Electronic Paper Based on Electrowetting", Nature, 425, 383-385 (2003). It is shown in U.S. Pat. No. 7,420,549 that such electro-wetting displays can be made bistable. Other well-known electro-optic display materials include liquid crystal displays (LCD), organic light-emitting diode displays (OLED), light emitting diode (LED), and micro/mini LED.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays.

Numerous patents and applications assigned to or in the names of the Massachusetts Institute of Technology (MIT), E Ink Corporation, E Ink, California, LLC and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic mediums; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564;

(h) Methods for driving displays; see for example U.S. Pat. Nos. 7,012,600 and 7,453,445;

(i) Applications of displays; see for example U.S. Pat. Nos. 7,312,784 and 8,009,348; and (j) Non-electrophoretic displays, as described in U.S. Pat. No. 6,241,921 and 2015/0277160; and applications of encapsulation and microcell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715 and other similar techniques). Thus, the resulting display can be flexible. Further, because the display medium can be printed (using a variety of methods), the display itself can be made inexpensively. Other types of electro-optic media may also be used in embodiments of the present invention.

An electro-optic display normally comprises a layer of electro-optic medium and at least two other layers disposed on opposed sides of the electro-optic medium, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a light-transmissive, electrically-conductive layer which acts as the top electrode layer of the final display and is in turn applied to a light-transmissive substrate. The capsules/binder coating is then dried to form a coherent layer of the electrophoretic medium firmly adhered to the electrically conductive layer, to provide an article of manufacture hereinafter referred to for convenience as a "front plane laminate" or "FPL".

Separately, a backplane, containing an array of pixel electrodes and an appropriate arrangement of conductors to connect the pixel electrodes to drive circuitry, is prepared.

To form the final display, the FPL is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide). In one exemplary form of such a process, the backplane is itself flexible and is prepared by printing the pixel electrodes and conductors on a plastic film or other flexible substrate. The usual lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

When the front plane laminate is used in a display, it is necessary to make an electrical connection between a voltage source and the light-transmissive electrically-conductive layer through which the electro-optic medium is viewed. (This light-transmissive electrically-conductive layer is sometimes referred to as the "top plane" electrode. In some instances, the connection is created directly with a wire or conductive trace directly coupled from the power supply or controller to the electrically-conductive layer. More typically, the voltage is routed along the backplane using fabricated traces leading to conductive pad, and the necessary electrical connection is achieved by providing at least one "connection area" of the display where the top conductive layer is accessible and not in contact with the electro-optic medium.

A connection area can be provided in two different ways. Firstly, the formation of the layer of electro-optic medium can be controlled so as to leave uncoated areas ("gutters") where no electro-optic medium is present, and portions of these uncoated areas can later serve as the connection areas. Alternatively, the whole surface of the laminate can be covered with the electro-optic medium and this medium later removed from the connection area in any convenient manner, for example by cutting, mechanical abrasion, or chemical degradation of the electro-optic layer. An electrically-conductive material, for example a conductive filler, such as a conductive silver paste or adhesive, is then inserted to contact the connection area and form an electrical connection between the top electrode layer and a top-plane connection (TPC) in the backplane, to complete the circuit.

In some cases, following the removal of the electro-optic medium from the connection area, the laminate may require cleaning to remove residue from the electro-optic medium; for example, if the electro-optic medium is an encapsulated electrophoretic material, it is desirable to remove any internal phase remaining after rupture of the capsules during removal of the electrophoretic material from the connection area. Because the top conductive layer is usually made of relatively fragile materials such as indium tin oxide (ITO), forming the connection area and inserting the conductive filler is a delicate process and solvents used in cleaning its perimeter walls should be selected that will dissolve the electro-optic layer without damaging the top conductive layer. Moreover, the amount of conductive filler should be sufficient to complete electrical circuit but not require quantities which may bleed, creep, or shift, or otherwise be apt to cause shorting. Importantly, when FPL is incorporated into a sealed display (a.k.a., a module) the FPL must be cut and a section cleaned for the top-plane connection prior to lamination to the backplane. This requires very precisely alignment between the cut piece and the backplane. Keeping all of the parts cleaned and aligned is especially difficult with larger displays, or when fabricating prototypes or custom displays without alignment jigs. Alignment jigs are impractical for one-off, displays and may even be impossible for some odd shaped displays. If the section in the FPL is made after lamination, the cleaning process is likely to damage the top and/or backplane conductive layer.

For the above reasons, traditional processes of forming a top plate connection can be complicated, time-consuming, and prone to damaging the top electrode layer and other parts of the final assembly if not carefully executed. Thus, there is a need for improved mass production techniques associated with the manufacture of top plate connections.

SUMMARY OF THE INVENTION

These and other aspects of the present invention will be apparent in view of the following description.

In a first aspect, provided herein is an article of manufacture comprising, in order: a light-transmissive substrate having an inner surface and an outer surface opposite the inner surface; a light-transmissive electrically-conductive layer; a layer of an electro-optic medium; an adhesive layer; and a release sheet in contact with the adhesive layer, wherein the layer of electro-optic medium is disposed between the light-transmissive electrically-conductive layer and the adhesive layer. The light-transmissive substrate comprises: a continuous portion; and a plurality of openings within the continuous portion, wherein the openings include an electrically-conductive material forming electrical connections between the light-transmissive electrically-conductive layer and contact spots on the outer surface of the light-transmissive substrate.

In a second aspect, there is provided a laminated electro-optic display comprising, in order: a front plane light-transmissive substrate having an inner surface and an outer surface opposite the inner surface; a light-transmissive electrically-conductive layer; a layer of an electro-optic medium in electrical contact with the light-transmissive electrically-conductive layer; and a backplane comprising a conductor; wherein: the front plane light-transmissive substrate comprises: a continuous portion, and a plurality of openings within the continuous portion, wherein the openings include an electrically-conductive material forming electrical connections between the light-transmissive electrically-conductive layer and contact spots on the outer surface of the front plane light-transmissive substrate.

In a third aspect, there is provided a light-transmissive conductive material comprising a light-transmissive substrate having a first surface, a second surface opposite the first surface, and a plurality of through-holes; wherein a conductive material selected from aluminum oxide, zinc oxide, indium oxide, indium-tin-oxide, and poly(3,4-ethylenedioxythiophene) is in contact with the first surface of the substrate, and the conductive material forms a light-transmissive conductive surface adjacent the first surface of the light-transmissive substrate while also providing electrical connections through the plurality of through-holes to contact spots on the second surface of the light-transmissive substrate, wherein the through-holes have an average diameter of at least 0.1 micrometers to at most 100 micrometers. In one embodiment, the light transmissive substrate is a polymeric material. In one embodiment, the through-holes have an average diameter of at least 0.5 micrometers to at most 10 micrometers. In one embodiment, the through-holes have a shape selected from the group consisting of circular, linear, and ellipsoidal. In one embodiment, the contact spots are located on a section of the outer surface of the light-transmissive substrate, wherein the section has an average density from at least 10 contact spots per square centimeter to at most 1000 contact spots per square centimeter.

In a fourth aspect, there is provided a method of manufacturing a laminated electro-optic display, the method comprising: laminating a front plane laminate to a backplane, wherein the front plane laminate comprises, in order: a front plane light-transmissive substrate having an inner surface and an outer surface opposite the inner surface; a light-transmissive electrically-conductive layer; a layer of an electro-optic medium in electrical contact with the light-transmissive electrically-conductive layer; and an adhesive layer, wherein the front plane light-transmissive substrate comprises: a continuous portion, and a plurality of openings within the continuous portion, wherein the openings include an electrically-conductive material forming electrical connections between the light-transmissive electrically-conductive layer and contact spots on the outer surface of the front plane light-transmissive substrate; and the backplane comprises a top plane connection; and forming an electrical connection between at least one of the contact spots on the outer surface of the front plane light-transmissive substrate and the top plane connection.

In a fifth aspect, there is provided a method of manufacturing a laminated electro-optic display, the method comprising laminating a front plane laminate to a backplane, wherein the front plane laminate comprises, in order a front plane light-transmissive substrate having an inner surface and an outer surface opposite the inner surface, a light-transmissive electrically-conductive layer, a layer of an electro-optic medium in electrical contact with the light-transmissive electrically-conductive layer, and an adhesive layer, wherein the front plane light-transmissive substrate comprises a continuous portion, and a plurality of openings within the continuous portion, wherein the openings include an electrically-conductive material forming electrical connections between the light-transmissive electrically-conductive layer and contact spots on the outer surface of the front plane light-transmissive substrate and the backplane comprises a top plane connection and forming an electrical connection between at least one of the contact spots on the outer surface of the front plane light-transmissive substrate and the top plane connection.

BRIEF DESCRIPTION OF THE FIGURES

The drawing figures depict one or more implementations in accord with the present concepts, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details.

The invention includes a light-transmissive substrate having an inner surface, an outer surface opposite the inner surface, and a plurality of through-holes. When coupled with a light-transmissive conductive material; such as indium tin oxide (ITO), the substrate provides electrical connections between a light-transmissive electrically-conductive layer, which may be used as a top electrode in an electro-optic display, and contact spots on the outer surface of the light-transmissive substrate. Accordingly, the light-transmissive substrate allows for simpler electrical connections for electro-optic displays, especially for large format devices that may need to be cut or assembled in the field. Additionally, the redundancy of having tens to hundreds of electrical contacts minimizes the chance that a device will be rendered inoperable due to a broken electrical connection.

As already mentioned, the present application provides, in one aspect, a novel article of manufacture (hereinafter referred to for convenience as a "front plane laminate" or "FPL") which simplifies the formation of electrical connections between a top light-transmissive electrically-conductive layer and a voltage source by forming electrical connections between the top light-transmissive electrically-conductive layer and contact spots on the outer surface of the front plane light-transmissive substrate. The electrical connections may be made within microscopic holes or vias and a simple clamping may be applied on the outside, e.g., the outside edge, to create an electrical connection to a portion of or all the outer surface of the front plane light-transmissive substrate. Alternatively, conductive pads or conductive tape can be used to make a connection to the front plane light-transmissive substrate. Alternatively, a front plane light-transmissive substrate with microvias may also provide better conforming capabilities for complex curves. For example, micro-holes or strips can be etched in the surface to allow deformation without breaking connections to the light-transmissive electrically-conductive layer. The inventions is especially useful in simplifying complex construction where multiple connections to the light-transmissive electrically-conductive layer are required.

Reference now is made in detail to the examples illustrated in the accompanying drawings and discussed below. The use of terms such as "top", "bottom", "over", "below", is merely a convention as the relative locations of two or more layers can be switched by reorienting an article of manufacture in different directions.

Front Panel Laminates

Figure 1:
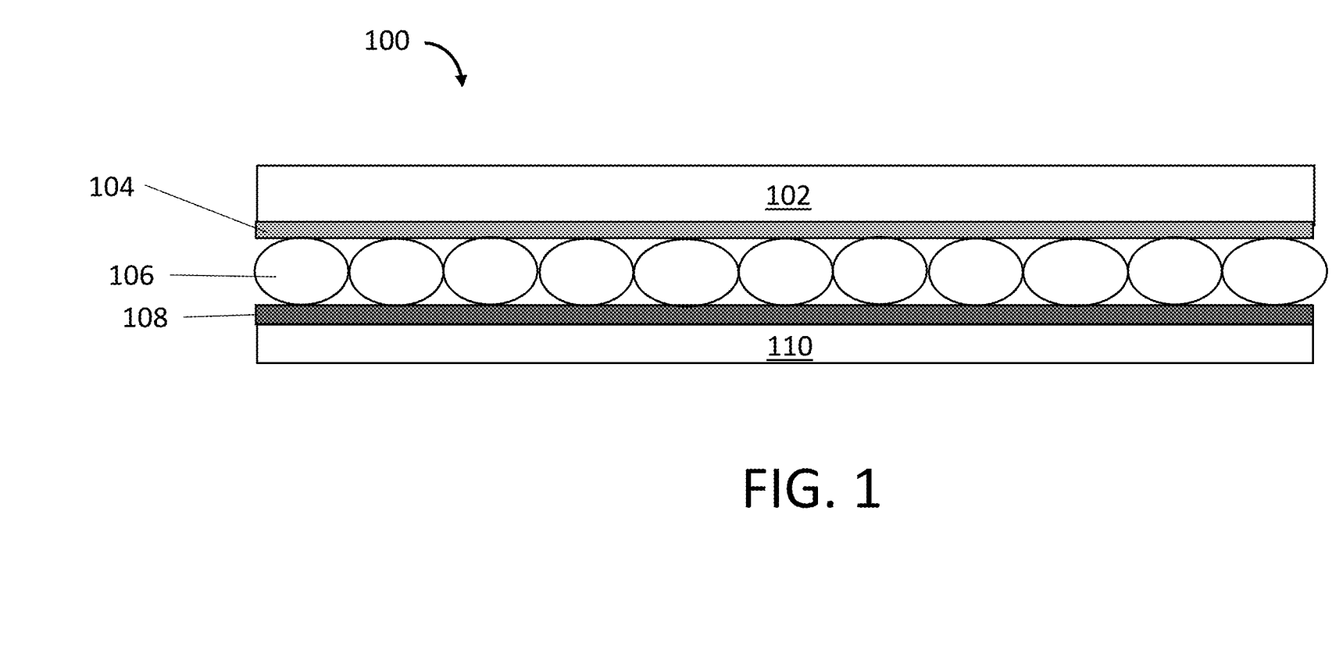
FIG. 1 is a schematic cross-section view through a traditional front plane laminate (FPL).

Before proceeding further, it is desirable to provide an illustrative description of a traditional front plane laminate ("FPL"), as schematically shown in the cross-section diagram of FIG. 1. The FPL 100 is similar to those described in, for example, U.S. Pat. No. 10,503,041, incorporated by reference herein. The FPL 100 may include, in order: a front plane light-transmissive substrate 102; a light-transmissive electrically-conductive layer 104 in contact with the inner surface of the front plane light-transmissive substrate; a layer of an electro-optic medium 106 in contact with the electrically-conductive layer; an adhesive layer 108; and a release sheet 110.

In many applications, front plane light-transmissive substrate 102 included a polyethylene terephthalate (PET) and the light-transmissive electrically-conductive layer 104 comprises indium tin oxide (ITO). Such material is commercially available in large rolls from e.g., Saint-Gobain. The light-transmissive electrically-conductive layer 104 is applied to light-transmissive substrate 102, which is usually flexible, in the sense that the substrate can be manually wrapped around a drum 10 inches (254 mm) in diameter, for example, without permanent deformation.

The term "light-transmissive" is used herein throughout the specification and claims to mean that the layer thus designated transmits sufficient light to enable an observer, looking through that layer, to observe the change in display states of the electro-optic medium, which will normally be viewed through the electrically-conductive layer and adjacent substrate; in instances where the electro-optic medium displays a change in reflectivity at non-visible wavelengths, the term "light-transmissive" should of course be interpreted to refer to transmission of the relevant non-visible wavelengths. The substrate 102 may be manufactured from glass or a polymeric film, for example polyethylene terephthalate (PET), and may have a thickness in the range from about 20 µm to about 650 µm, more typically about 50 µm to about 250 µm. The electrically-conductive layer is typically a thin layer of a so-called "transparent conducting oxide" such as aluminum oxide, zinc oxide, indium zinc oxide, or indium-tin-oxide (ITO), or electrically-conductive layer may include a conductive polymer, such as poly(3,4-ethylenedioxythiophene) (PEDOT). The design may also include hybrid materials, such as a combination of conductive polymers and conducting oxides, or the design may also include dilute amounts of conductive fillers, such as silver whiskers or flakes, or exotic materials such as nanotubes and graphene. In some embodiments, the substrate 102 could be a rigid light-transmissive material such as glass or transparent polycarbonate or acrylic.

Typically, a coating of electro-optic medium that can be switched between optical states 106 is applied over the electrically-conductive layer 104, such that the electro-optic medium 106 is in close proximity to the electrically-conductive layer 104. The electro-optic medium will typically feature an electrophoretic material including a plurality of electrically-charged particles disposed in a fluid and capable of moving through the fluid under the influence of an electric field. The electrophoretic material can be selected such that the front panel laminate interchangeably and reversibly achieves different states when an appropriate electric field is applied, for example the electrophoretic medium may switch between clear and opaque, or color 1 and color 2, or clear and color 1 and color 2.

In example embodiments, the electro-optic medium may be in the form of an oppositely charged dual particle encapsulated medium. Such encapsulated media includes numerous small capsules, each of which itself comprises an internal phase containing electrophoretically-mobile particles suspended in a liquid suspension medium, and a capsule wall surrounding the internal phase. Typically, the capsules are themselves held within a polymeric binder to form a coherent layer. When the coherent layer is positioned between two electrodes the optical states can be reversed with the presentation of a suitable electric field. The suspension medium may contain a hydrocarbon-based liquid in which are suspended negatively charged white particles and positively charged black particles. In such an embodiment, upon application of an electrical field across the electro-optic medium, the white particles may move to the positive electrode and the black particles may move to the negative electrode, for example, so that the electro-optic medium 106 appears, to an observer viewing the display through the substrate 102, white or black depending upon whether the electrically-conductive layer 104 is positive or negative relative to the backplane at any point within the final display. The electro-optic medium 106 may alternatively comprise a plurality of colored particles in addition to black and/or white particles, each color having its respective charge polarity and strength.

A layer of lamination adhesive 108 may be coated over the electro-optic medium layer 106, and a release sheet 110 may be applied over the adhesive layer 108. The release sheet may be of any known type, provided of course that it does not contain materials which might adversely affect the properties of the electro-optic medium, and numerous suitable types of release sheet will be known to those skilled in the art. Common release sheets comprise a substrate such as paper or a plastic film, for example a PET film that is approximately about 150 µm to about 200 µm in thickness and coated with a low surface energy material, for instance a silicone. In some instances, the release sheet is metalized to allow for application of a potential across the electro-optic medium so that functionality can be assessed during assembly of a downstream product.

Figure 2:
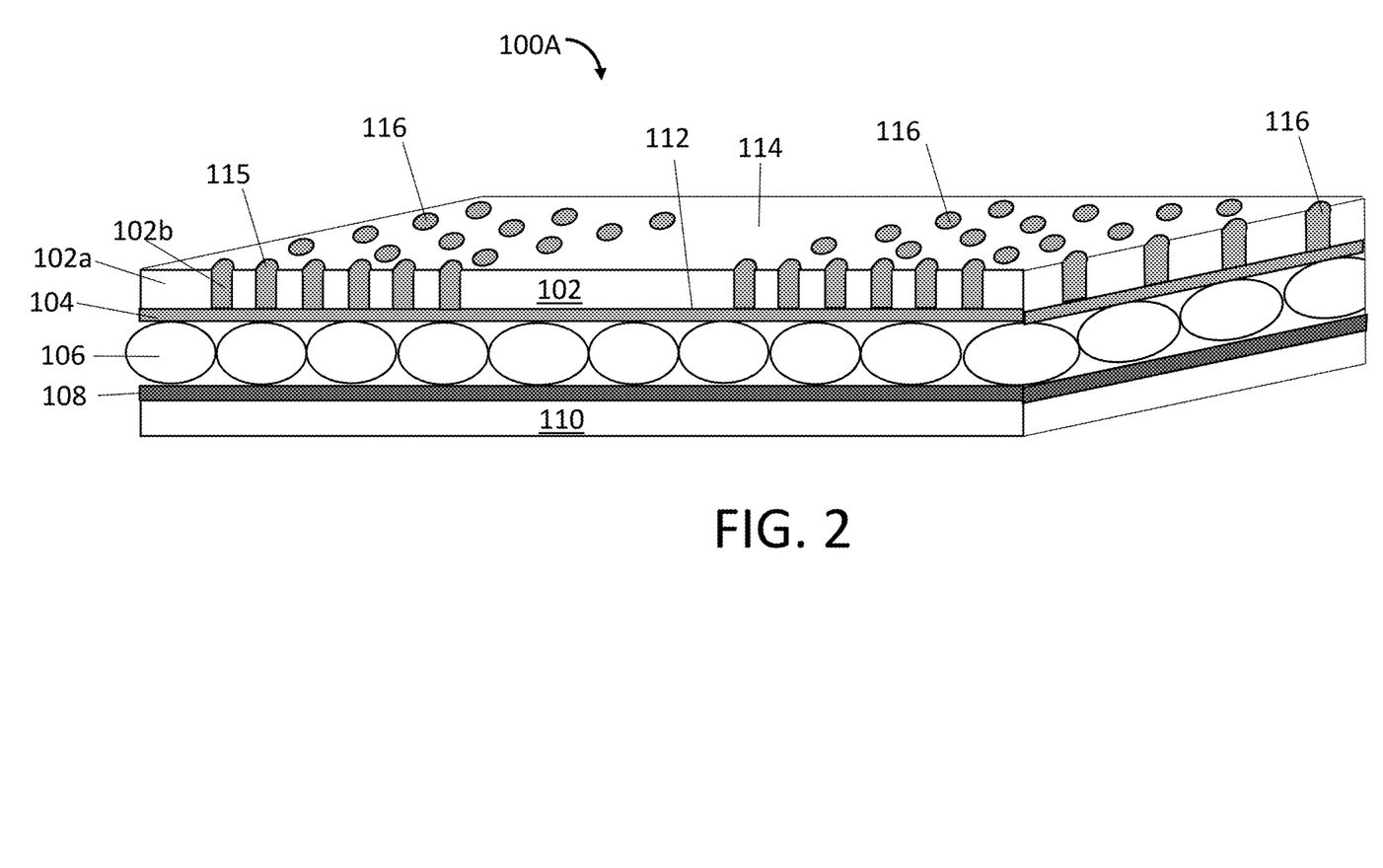
FIG. 2 is a schematic perspective view cross-section through a front plane laminate including a light-transmissive substrate of the invention.

Referring now to FIG. 2, a novel front plane laminate (designated 100A) according to one aspect of the invention is illustrated. The FPL is substantially identical to the laminate 100 shown in FIG. 1, except that front plane light-transmissive substrate 102, having inner surface 112 and outer surface 114 opposite the inner surface, is characterized by a composite structure including a continuous portion 102a and a plurality of openings 102b which are distributed within the continuous portion 102a. The openings 102b include an electrically-conductive material 115 forming electrical connections between the electrically-conductive layer 104 and one or more contact spots 116 on outer surface 114. Optionally, electrically-conductive layer 104 may be segmented in two or more sections, each section being in contact with a subset of the contact spots (not shown), giving rise to an architecture where a short circuit in one section will not result in a failure of the other sections, too. Electrical connections can be applied locally or to the entire outer surface, and a protective layer (not shown), for example a coat of a clear acrylic polymer or silicon, may be added to seal some or all the contact spots and provide a moisture barrier while preventing unwanted shorts after assembly.

In exemplary embodiments, the continuous portion 102a may be may be manufactured from glass or a polymeric film, for example polyethylene terephthalate (PET), which is subjected to etching, cutting, laser ablation or any applicable perforation techniques to leave openings. Alternatively the continuous portion 102a may be micro-indented to create through-holes or valleys that can be filled during a sputtering process by which the conductive layer material, such as ITO, is added. Alternatively, PET films can be softened with heat, stretched over a form, and holed formed with jets of high-pressure gas. A conductive material may then be used to fill the openings, to form the contact spots 116. The openings may be provided in a variety of shapes, sizes, and densities to suit the application at hand. Irrespective of shape, individual and average spot sizes may be defined in terms of a given spot dimension. Unless otherwise provided or apparent from context, the term "dimension" means a length, width, or diameter of a contact spot along a surface of a layer. Typically, "length" means an extension in the longitudinal direction and width means an extension in the width direction. "Diameter", when used in reference to a contact spot, is intended to identify the longest straight line segment between two points on the spot along the outer surface of the front plane light-transmissive substrate. In some non-exclusive embodiments, the geometry of the contact spots 116 is such that their average diameter falls in a range between about 0.1 µm to about 100 µm. In additional embodiments, the average contact spot diameter falls in a range between about 0.5 µm to about 10 µm.

Figures 3A, 3B, 3C:
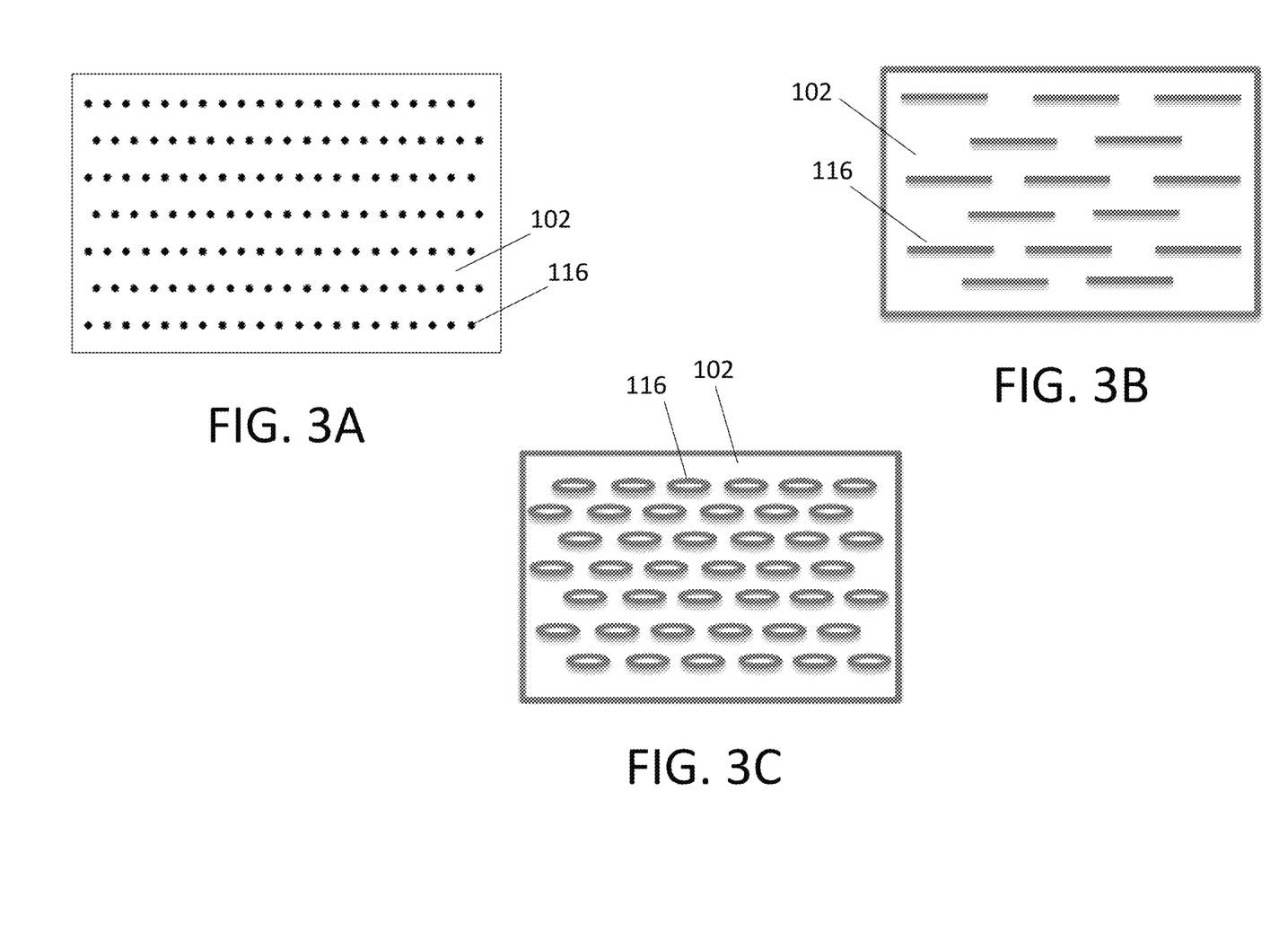
FIGS. 3A-3C are schematic top plan views of front plane light-transmissive substrates having contact spots of differing geometries according to embodiments of the invention.

Illustrated in the schematic top view in FIG. 3A is a front plane light-transmissive substrate 102 having contact spots 116 of circular geometry which may be fabricated by micro-etching a polymeric film substrate to form rounded openings. Exemplary average indentation diameter ranges include about 10 µm to about 100 µm, about 10 µm to about 75 µm, and about 10 µm to about 50 µm. FIG. 3B illustrates a substrate which has been micro-etched to yield strip-shaped openings having an average width equal to or less than 100 µm. Exemplary average strip width ranges include about 1 µm to about 100 µm, about 2 µm to about 75 µm, and about 5 µm to about 50 µm. Schematically depicted in FIG. 3C is another substrate which has been micro-etched to form ellipsoid-shaped openings having an average minor axis length equal to or less than about 100 µm. Exemplary average minor axis length ranges include about 1 µm to about 100 µm, about 5 µm to about 75 µm, and about 10 µm to about 50 µm.

Figures 4A, 4B, 4C:
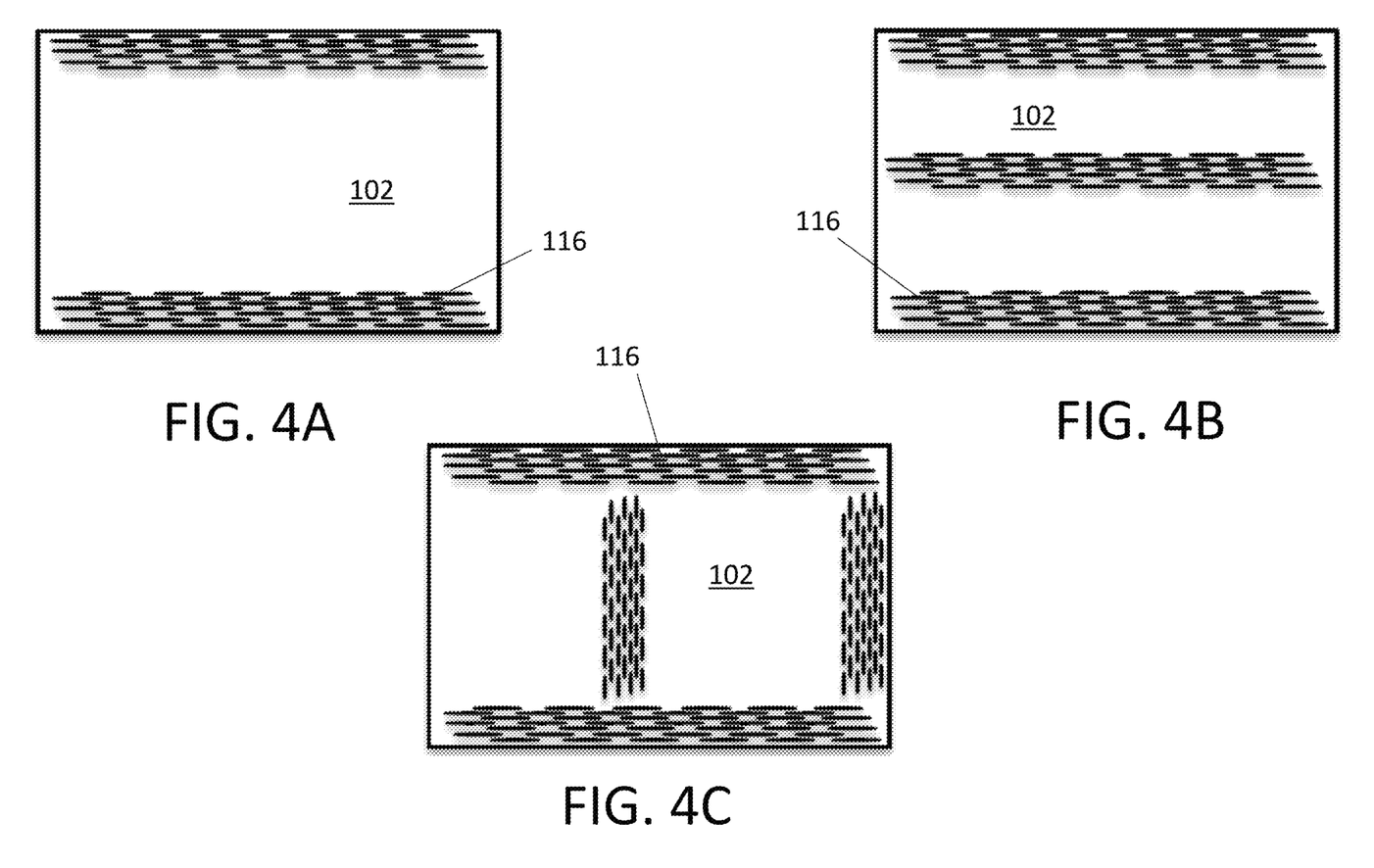
FIGS. 4A-4C are a schematic top plan views of front plane light-transmissive substrates featuring elongated contact spots formed into repeating patterns according to embodiments of the invention.

A variety of contact spot shapes, contact spot surface densities, and spatial arrangements may be specifically engineered to improve the capabilities of the front panel laminate to adopt complex and curved shapes without breaking electrical connections while maintaining the structural integrity of the electro-optic medium. In some embodiments, the conductive material may be deposited in the openings after the continuous phase has been perforated and shaped to conform to a desired geometry and contact spot density. One or more sections of the front plane light-transmissive substrate may be prepared in this manner so as to yield individualized architectures to serve differing types of applications. As illustrated in the schematic top plan view of FIG. 4A, elongated contact spots 116 may formed into repeating patterns at the edges of the front plane light-transmissive substrate 102. In FIG. 4B, the pattern is also repeated in the center of the front plane light-transmissive substrate, while that of FIG. 4C features patterns of different sizes and relative orientations. This approach enables the fabrication of front panel laminates having geometries and contact spot patterns specifically designed to suit any kind of application. The contact spots 116 may formed located in specific sections of the front plane light-transmissive substrate 102 in densities ranges suited to the application at hand. In a representative embodiment, a section of the front plane light-transmissive substrate 102 contains contact spots 116 at a density in the range from about 10 contact spots per square centimeter to about 1000 contact spots per square centimeter. In another embodiment, a section of the front plane light-transmissive substrate 102 contains contact spots 116 at a density in the range from about 50 contact spots per square centimeter to about 500 contact spots per square centimeter. Also contemplated is an embodiment where the density is from about 50 contact spots per square centimeter to about 250 contact spots per square centimeter.

Manufacturing the Front Panel Laminates

As described above, the contact spots 116 may be formed by introducing an electrically-conductive material 115 into openings 102b present in the continuous portion 102a of the front plane light-transmissive substrate 102. Also as described above, the openings 102b may be indentations made by removing portions of a polymeric layer. In an embodiment a film of flexible light-transmissive polymer (e.g., PET) may be indented, drilled, ablated, etc. to form a plurality of openings. The flexible light-transmissive polymer may be subsequently coated with a light-transmissive conductive material (e.g., ITO), e.g., through sputtering. As the light-transmissive material is coated on the inner surface, the openings 102b are also filled with the light-transmissive conductive material, providing an electrical connection to the outer surface 114 of the front plane light-transmissive substrate (PET film). Because the openings 102b are small and because both the substrate 102 and the conductive material 115 are light-transmissive, the conducting material 115 is not visually distracting. In another embodiment, a flowable conductive material precursor, such as a solution or paste, is introduced into the openings then cured to yield the electrical connections and contact spots. Depending on the relatively small diameter of the openings and the viscosity of the precursor, this process may prove difficult to carry out in practice. To overcome these difficulties, suction may be applied to improve precursor flow and/or a surfactant may be added to the precursor to lower surface tension with the surface of the openings. In a further, non-exclusive embodiment, the conductive material 115 and/or its precursor may be magnetizable in instances where this may assist in filling the openings with the material. In exemplary embodiments, the same microfabrication methods as used for manufacturing microvias in high density interconnect (HDI) multilayer printed circuit boards (PCBs) may be used, for instance by adding layers at successive times as carried out in sequential build up (SBU) manufacturing technologies with copper or other conductive materials such as carbon or carbon nanotubes. In a further embodiment, the conductive material may be applied by electroplating techniques.

In a broader sense, the interspersed portion need not necessarily be formed by introducing a conductive filling within openings in the continuous portion. In some embodiments, the front plane light-transmissive substrate may be manufactured by combining insulating and conductive materials in an anisotropic fashion, thereby giving rise to electrical connections and corresponding conductive spots interspersed within the continuous portion. In one representative example, the front plane light-transmissive substrate may be fabricated by interweaving PET fibers with a conductive yarn, e.g., as PET coated with a conductive material, for example a metal or a conductive polymer such as polyaniline (PAM). Throughout the manufacturing process, the conductive yarn is selectively included in zones of the front plane light-transmissive substrate where electrical connections and contact spots are meant to be formed.

All the aforementioned approaches presume that the contact spots are formed before the front plane light-transmissive substrate is combined with the other parts of the front plane laminate. However, in certain embodiments, the conductive material may be introduced in the openings after the FPL has been assembled, provided that the conductive material precursor does not flow through the electro-optic medium and causes it to short.

Electro-Optic Displays

In one application, the front plane laminate is laminated to a backplane, to form an electro-optic display. There are three main categories of backplanes: an active matrix, a passive matrix, and a direct drive backplane.

For a typical active matrix backplane, an array of thin film transistors (TFT) (not shown) are formed on the surface of a backplane substrate 202 and each transistor acts as a switch for a pixel electrode (212a, 212c). The TFT is addressed by a set of narrow multiplexed electrodes (gate lines and source lines). Passive-matrix backplanes use a simple grid to supply the charge to a particular pixel on the display. The grids are formed on top and bottom substrates. One substrate forms the "columns" and the other substrate forms the "rows". In a passive matrix, the column or row is made from a transparent conductive material, usually indium-tin oxide (ITO). The rows or columns are connected to integrated circuits that control when a charge is sent down a particular column or row. In a direct-drive backplane, the bottom substrate may include an electrical connector located on an edge of the substrate from which a plurality of conductors extends to form contacts to the segments of a segmented conductive layer such that each segment is electrically connected to a respective conductor. There is no limitation to the type of backplane which may be used in the various embodiments of the present invention, provided that a top plane connection through the contact spots disposed on the outer surface of the front plane light-transmissive substrate is formed.

Figure 5:
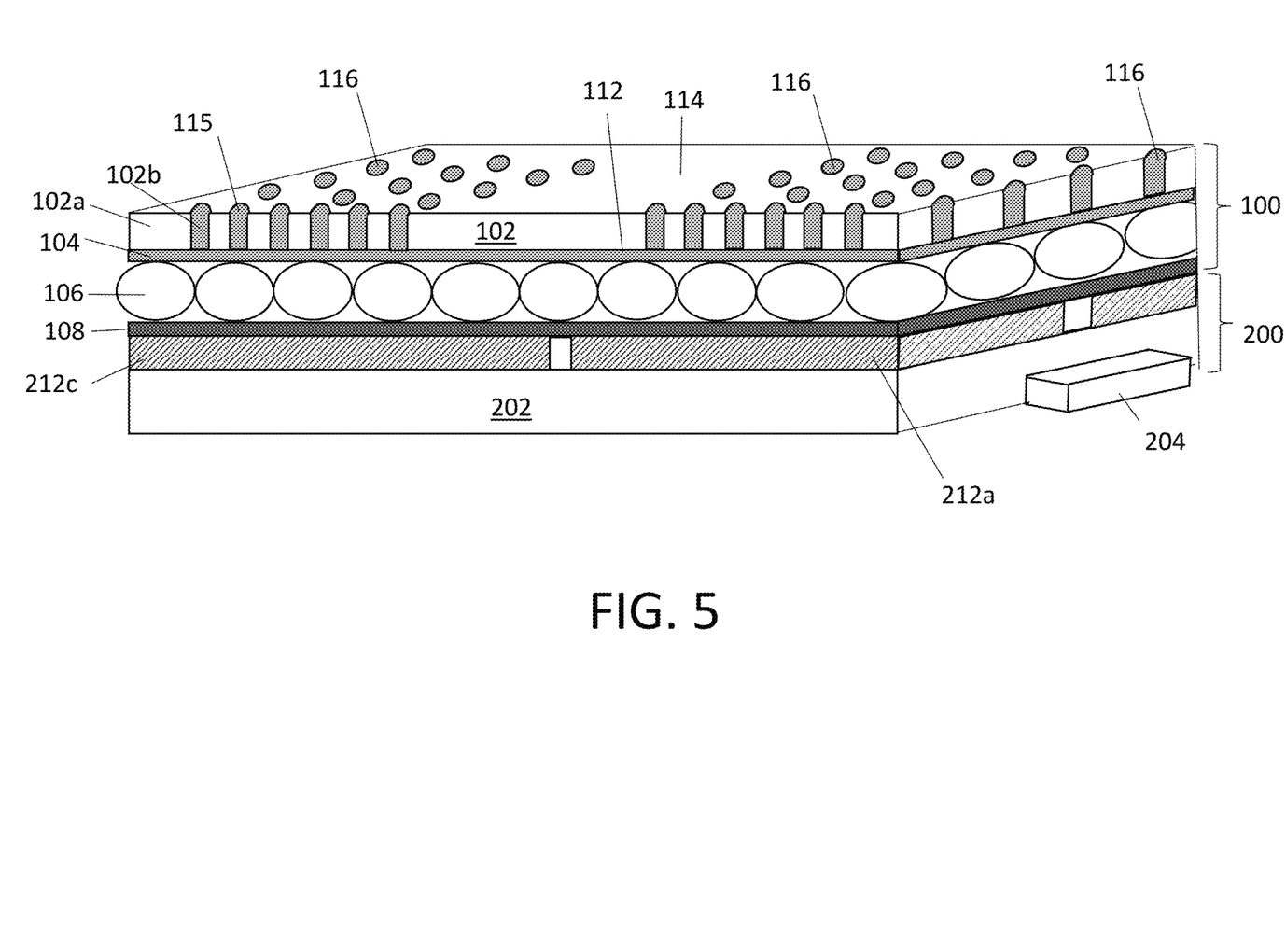
FIG. 5 is a perspective view cross-section through a laminated electro-optic display according to an embodiment of the invention.

Turning now to FIG. 5, assembly of an electro-optic display using FPL 100 and a backplane such as 200 may be effected by removing the release sheet 110 and contacting the adhesive layer 108 with the backplane 200 under conditions effective to cause the adhesive layer to adhere to the backplane, thereby securing the adhesive layer, layer of electro-optic medium 106 and light-transmissive electrically-conductive layer 104 to the backplane. The FPL 100 can be cut larger than the final display size and could even be a continuous sheet as in a roll-to-roll process. This allows for coarse tolerances in alignment of the FPL 100 and backplane 200, which is especially helpful for large displays. Once laminated (not shown), the display can be cut to its final size, potentially using alignment marks or pins on the backplane to allow for precisely aligning the cut to the backplane.

The lamination of the FPL 100 to the backplane 200 may advantageously be carried out by vacuum lamination. Vacuum lamination is effective in expelling air from between the two materials being laminated, thus avoiding unwanted air bubbles in the final display; such air bubbles may introduce undesirable artifacts in the images produced on the display. However, vacuum lamination of the two parts of an electro-optic display in this manner may impose stringent requirements upon the lamination adhesive used, especially in the case of a display using an encapsulated electrophoretic medium. The lamination adhesive 108 should have sufficient adhesive strength to bind the electro-optic layer to the backplane, and in the case of an encapsulated electrophoretic medium, the adhesive 108 should also have sufficient adhesive strength to mechanically hold the capsules together. The adhesive 108 is preferably chemically compatible with all the other materials in the display. If the electro-optic display is to be of a flexible type, the adhesive 108 should have sufficient flexibility not to introduce defects into the display when the display is flexed. The lamination adhesive 108 should have adequate flow properties at the lamination temperature to ensure high quality lamination. Furthermore, the lamination temperature is preferably as low as possible. An example of a useful lamination adhesive that may be incorporated in the various embodiments of the present invention an aqueous polyurethane dispersion known as a "TMXDI/PPO" dispersion, as described in U.S. Pat. No. 7,342,068, which is incorporated by reference in its entirety.

Figure 6:
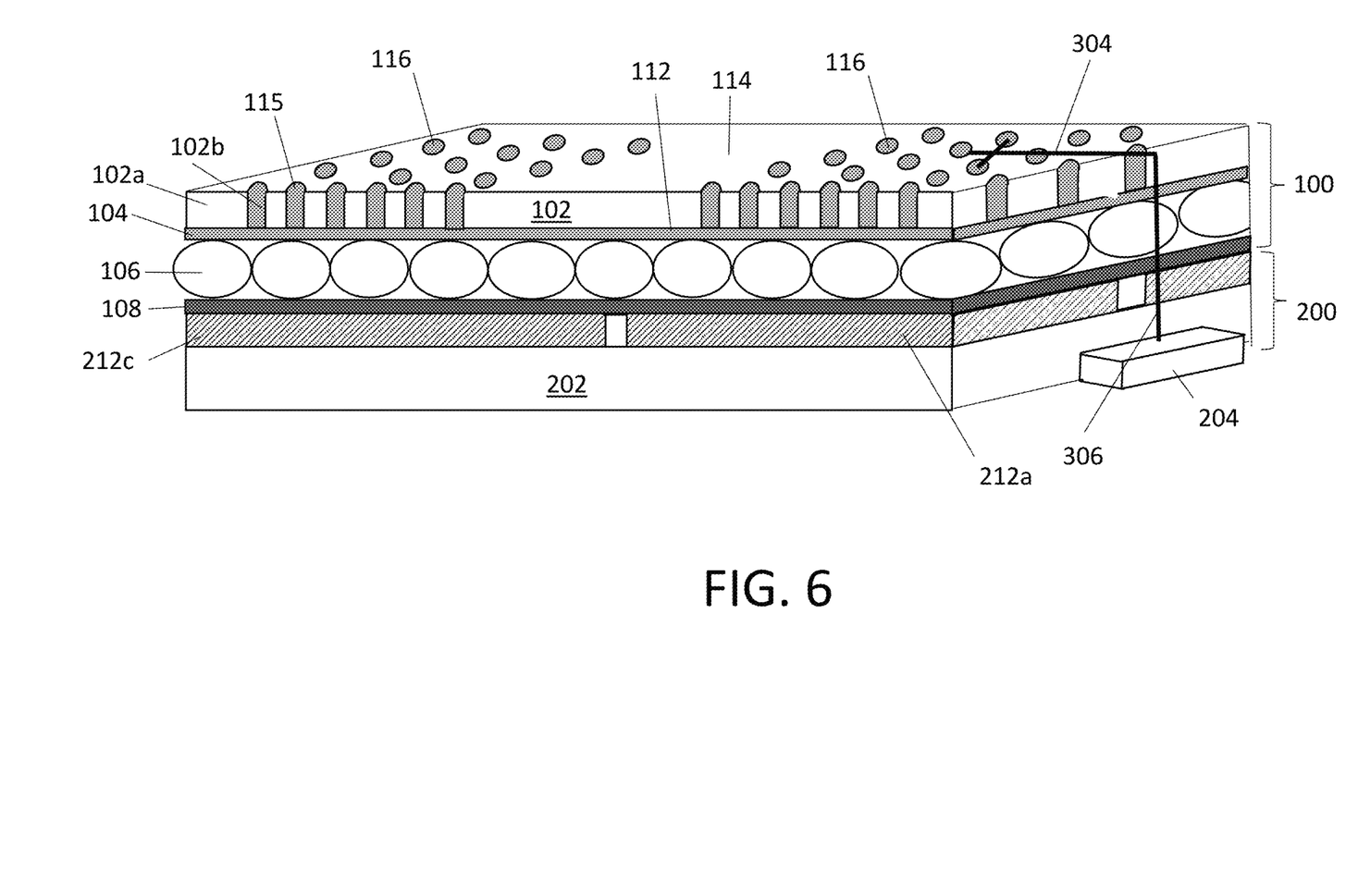
FIG. 6 is a perspective view cross-section through the laminated electro-optic display of FIG. 5 with an electrical connection created between the front plane laminate contact spots and a backplane conductor.

A top-plane connection 204 may be electrically connected to all or a specific subset of the conductive spots 116. Typically, the top-plane connection 204 from the backplane is integrated into the backplane 200, but it is represented as a stand-alone item in FIGS. 5 and 6 for clarity. In a representative embodiment, as schematically illustrated in FIG. 6, this connection may be accomplished with a wire or trace (304/306) or a combination thereof. Because each conductive spot 116 is connected to the light-transmissive conductive layer 104, it is not necessary to connect each conductive spot 116 to the top-plane connection 204. However, typically more than one conductive spot is connected. In some instances, conductive traces are applied across the outer surface, as exemplified in FIG. 6 by conductive transparent wiring 304 which links a subset of the contact spots to conductor 306 and backplane connection 204. In such embodiments, a protective layer, like clear coat of acrylic or silicon could be used to isolate the connecting points and prevent an unwanted shorts after assembly (not shown). In alternative embodiments, a conductive contact pad coupled to the wire 304 can be affixed to the outer surface, e.g., with a conductive adhesive. In other embodiments, a connection between the top-plane connection 204 and the conductive spots 116 can be made with a conductive clamp, e.g., an alligator clip.

Flexible Variable Color and Transmission Coverings

In a further application, a front plane laminate may be cut into sections which are sealed and in turn interwoven with, for example, sections of a traditional (e.g., fabric, polymer) material. Alternatively, strips of one or more types of front plane laminate 100 can be interwoven with fabric strips 700 to form a woven structure of fabric 700 and front plane laminate 100. In the example weave schematically illustrated in FIG. 7, FPL strips 100 are interwoven with fabric sections 700 to produce a flexible weave that is not completely transparent, but may be altered on demand to increase or decrease the amount and color of the light that is reflected or transmitted through the weave. Alternatively, both directions of the weave may be accomplished with strips of front plane laminate 100. Variable color and transmission coverings having this type of architecture are described in U.S. Pat. No. 11,086,186, which is incorporated by reference in its entirety. However, and as anticipated above, in order to make electrical contact with the conductive layer within a traditional laminate, it is usually necessary to provide at least one "connection area" where the conductive layer is free from the electro-optic medium. As a result, each FPL strip in the weave requires its own individual connection area, leading to a structurally complex structure which is relatively expensive and laborious to manufacture.

Figure 7:
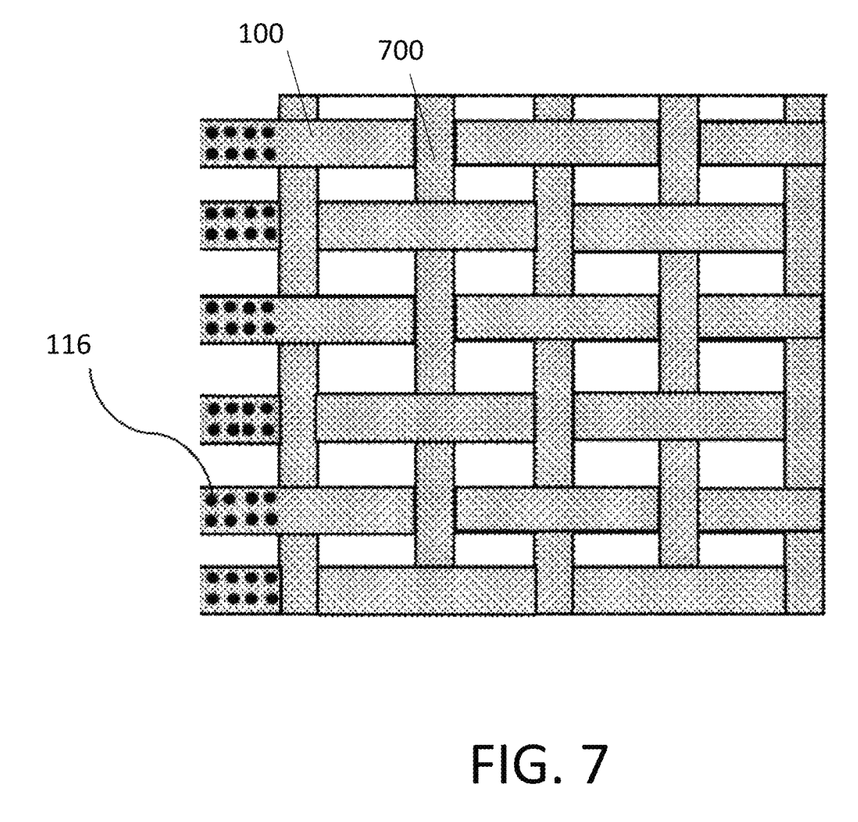
FIG. 7 is a schematic top view of a display device made from strips including the invention described herein and interwoven with fabric sections to produce a flexible weave that may be altered on demand to increase or decrease the amount and color of the light that is reflected or transmitted through the weave.

In the structure of FIG. 7, forming the electrical contact is greatly simplified on FPL strips 100 made from a novel laminate as disclosed in the present application. The contact spots 116 on the upper surface of the light-transmissive substrate 102 may be easily connected to the conductive layer of a given strip by applying a conductive clamp or laying wires or traces. The mixture of electro-optic and traditional materials in a weave need not be in a 1:1 ratio, as shown in FIG. 7. For example, a variable transmission structure may include 10 times more surface area of electro-optic material than traditional material. Alternatively, a variable transmission structure may include 10 times more surface area of traditional material than electro-optic material. Of course, intermediate ratios are also possible, such as 5:1, 3:1, 2:1, 1:1, 1:2, 1:3, 1:5, etc. In other embodiments, the variable transmission structure may include two different types of electro-optic material that are interwoven, similar to FIG. 7. Woven materials including three or more electro-optic materials are also contemplated. In one example, FPL strips containing bistable, reflective, or variable transmission materials may be woven together with traditional fabrics. In another embodiment, variable transmission strips may be woven together to form a flexible fabric that can be switched between light-transmissive and tinted states.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention. All of the contents of the aforementioned patents and applications are incorporated by reference herein in their entireties. In the event of any inconsistency between the content of this application and any of the patents and application incorporated by reference herein, the content of this application shall control to the extent necessary to resolve such inconsistency.

The invention claimed is:

1. An article of manufacture comprising, in order:
    a light-transmissive substrate having an inner surface and an outer surface opposite the inner surface;
    a light-transmissive electrically-conductive layer;
    a layer of an electro-optic medium;
    an adhesive layer; and
    a release sheet in contact with the adhesive layer, wherein the layer of electro-optic medium is disposed between the light-transmissive electrically-conductive layer and the adhesive layer,
    wherein the light-transmissive substrate comprises:
        a continuous portion; and
        a plurality of openings within the continuous portion, wherein the openings include an electrically-conductive material formed from the same material as the light-transmissive electrically-conductive layer, thereby providing electrical connections between the light-transmissive electrically-conductive layer and contact spots on the outer surface of the light-transmissive substrate.

2. The article of manufacture according to claim 1, wherein the continuous portion of the light-transmissive substrate comprises a micro-indented polymeric material.

3. The article of manufacture according to claim 1, wherein the light-transmissive electrically-conductive layer comprises a material selected from the group consisting of aluminum tin oxide, indium-tin-oxide, poly (3,4-ethylenedioxythiophene), and combinations thereof.

4. The article of manufacture according to claim 1, wherein the electro-optic medium is an encapsulated electrophoretic medium.

5. The article of manufacture according to claim 1, further comprising a protective layer positioned on the outer surface of the light-transmissive substrate.

6. The article of manufacture according to claim 1, wherein the contact spots have an average diameter of at least 0.1 micrometers to at most 100 micrometers.

7. The article of manufacture according to claim 1, wherein the contact spots have an average diameter of at least 0.5 micrometers to at most 10 micrometers.

8. The article of manufacture according to claim 1, wherein the contact spots are located on a section of the outer surface of the light-transmissive substrate, wherein the section has an average density from at least 10 contact spots per square centimeter to at most 1000 contact spots per square centimeter.

9. A laminated electro-optic display comprising, in order:
a front plane light-transmissive substrate having an inner surface and an outer surface opposite the inner surface;
a light-transmissive electrically-conductive layer;
a layer of an electro-optic medium in electrical contact with the electrically-conductive layer; and
a backplane comprising a conductor;
wherein:
the front plane light-transmissive substrate comprises: a continuous portion, and a plurality of openings within the continuous portion, wherein the openings include an electrically-conductive material formed from the same material as the light-transmissive electrically-conductive layer, thereby providing electrical connections between the light-transmissive electrically-conductive layer and contact spots on the outer surface of the front plane light-transmissive substrate.

10. The laminated electro-optic display according to claim 9, wherein the continuous portion comprises a micro-indented polymeric material.

11. The laminated electro-optic display according to claim 9, wherein the electro-optic medium is an encapsulated electrophoretic medium.

12. The laminated electro-optic display according to claim 9, further comprising a protective layer positioned on the outer surface of the front plane light-transmissive substrate.

13. The laminated electro-optic display according to claim 9, wherein the contact spots have an average diameter of at least 0.1 micrometers to at most 100 micrometers.

14. The laminated electro-optic display according to claim 9, wherein the contact spots have an average diameter of at least 0.5 micrometers to at most 10 micrometers.

15. The laminated electro-optic display according to claim 9, wherein the contact spots are located on a section of the outer surface of the front plane light-transmissive substrate, wherein the section has an average density from at least 10 contact spots per square centimeter to at most 1000 contact spots per square centimeter.

16. A light-transmissive conductive material comprising:
a light-transmissive substrate having a first surface, a second surface opposite the first surface, and a plurality of through-holes; and
a conductive material selected from aluminum oxide, zinc oxide, indium oxide, indium-tin-oxide, and poly (3,4-ethylenedioxythiophene) in contact with the first surface of the substrate and filling the plurality of through-holes,
the conductive material forming a light-transmissive conductive surface adjacent the first surface of the light-transmissive substrate and providing electrical connections through the plurality of through-holes to contact spots on the second surface of the light-transmissive substrate,
wherein the through-holes have an average diameter of at least 0.1 micrometers to at most 100 micrometers.

17. The light-transmissive conductive material according to claim 16, wherein the light transmissive substrate is a polymeric material.

18. The light-transmissive conductive material according to claim 16, wherein the through-holes have an average diameter of at least 0.5 micrometers to at most 10 micrometers.

19. The light-transmissive conductive material according to claim 16, wherein the through-holes have a shape selected from the group consisting of circular, linear, and ellipsoidal.

20. The light-transmissive conductive material according to claim 16, wherein the contact spots are located on a section of the outer surface of the light-transmissive substrate, wherein the section has an average density from at least 10 contact spots per square centimeter to at most 1000 contact spots per square centimeter.

* * * * *